(12) United States Patent
Gao et al.

(10) Patent No.: US 12,474,585 B1
(45) Date of Patent: Nov. 18, 2025

(54) DISPLAY DEVICES HAVING GRATING SUBSTRATES WITH SUB-WAVELENGTH PATTERNS

(71) Applicant: Apple Inc., Cupertino, CA (US)

(72) Inventors: Jian Gao, Fremont, CA (US); Ligang Wang, San Jose, CA (US); Byron R Cocilovo, Boulder, CO (US); Francesco Aieta, Alameda, CA (US); Brandon Born, Sunnyvale, CA (US); Se Baek Oh, Hillsborough, CA (US); Graham B Myhre, Campbell, CA (US); Zhibing Ge, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 257 days.

(21) Appl. No.: 18/468,623

(22) Filed: Sep. 15, 2023

Related U.S. Application Data (60) Provisional application No. 63/408,773, filed on Sep. 21, 2022.

(51) Int. Cl.
*G02B 27/01* (2006.01)
*G02B 6/26* (2006.01)
*G02B 27/00* (2006.01)

(52) U.S. Cl.
CPC ......... *G02B 27/0172* (2013.01); *G02B 6/262* (2013.01); *G02B 27/0081* (2013.01)

(58) Field of Classification Search
None
See application file for complete search history.

(56) References Cited

U.S. PATENT DOCUMENTS

| | | | | |
|---|---|---|---|---|
| 10,598,938 B1 * | 3/2020 | Huang | .................. | G02B 6/4214 |
| 10,983,263 B2 * | 4/2021 | Kleinman | ............ | G09G 3/2003 |
| 11,022,798 B2 * | 6/2021 | Yeoh | .................... | G02B 26/004 |
| 11,187,904 B2 * | 11/2021 | Chi | ........................ | G02B 27/44 |
| 11,204,462 B2 * | 12/2021 | Klug | .................. | G02B 27/0172 |

(Continued)

FOREIGN PATENT DOCUMENTS

WO     2022064101 A1     3/2022

OTHER PUBLICATIONS

U.S. Appl. No. 18/349,480, filed Jul. 10, 2023.
U.S. Appl. No. 18/349,567, filed Jul. 10, 2023.

*Primary Examiner* — Jerry Rahll
(74) *Attorney, Agent, or Firm* — Treyz Law Group, P.C.; Michael H. Lyons (57) ABSTRACT

A display may include a waveguide, an input coupler having a first surface relief grating (SRG) in a substrate on the waveguide, a cross-coupler having a second SRG in the substrate, and an output coupler having a third SRG in the substrate. The display may direct light to an eye box. A capping layer may be disposed over the substrate. An anti-reflective coating may be disposed over the capping layer. Microstructures may be disposed in non-SRG regions of the substrate and may be non-diffractive at visible wavelengths. The microstructures may include grooves and may have a similar filling factor to the SRGs. This may cause portions of the capping layer over the microstructures to sink into the grooves, thereby providing the capping layer with a relatively uniform thickness across a lateral area of the waveguide, without the microstructures producing visible artifacts or interacting with the light.

20 Claims, 6 Drawing Sheets

(56) References Cited

U.S. PATENT DOCUMENTS

| | | | |
|---|---|---|---|
| 11,460,609 B2* | 10/2022 | Peroz | G02B 6/00 |
| 11,994,672 B2* | 5/2024 | Pfeiffer | G02B 27/0081 |
| 12,105,289 B2* | 10/2024 | Khorasaninejad | G02B 6/26 |
| 2009/0141324 A1* | 6/2009 | Mukawa | G02B 5/32 |
| | | | 359/13 |
| 2016/0216416 A1* | 7/2016 | Tekolste | G02B 5/1842 |
| 2016/0282622 A1* | 9/2016 | Hiraide | G02B 27/0176 |
| 2017/0307886 A1* | 10/2017 | Stenberg | G02B 5/1842 |
| 2018/0052276 A1* | 2/2018 | Klienman | G06F 3/013 |
| 2018/0364487 A1* | 12/2018 | Yeoh | G02B 27/4272 |
| 2019/0056591 A1* | 2/2019 | Tervo | G02B 6/0038 |
| 2020/0012044 A1* | 1/2020 | Klug | G02B 27/0172 |
| 2021/0055552 A1* | 2/2021 | Chi | G02B 27/4272 |
| 2021/0109365 A1* | 4/2021 | Blomstedt | G02B 5/1861 |
| 2021/0157032 A1* | 5/2021 | Peroz | G02B 6/008 |
| 2021/0199971 A1* | 7/2021 | Lee | G02B 27/0172 |
| 2022/0066204 A1* | 3/2022 | Pfeiffer | G02B 27/0081 |
| 2022/0099976 A1* | 3/2022 | Khorasaninejad | G02B 5/223 |
| 2022/0128817 A1 | 4/2022 | Singh et al. | |

* cited by examiner

DISPLAY DEVICES HAVING GRATING SUBSTRATES WITH SUB-WAVELENGTH PATTERNS

This application claims the benefit of U.S. Provisional Patent Application No. 63/408,773, filed Sep. 21, 2022, which is hereby incorporated by reference herein in its entirety.

BACKGROUND

This disclosure relates to optical systems such as optical systems in electronic devices having displays.

Electronic devices can include displays that provide images near the eyes of a user. Such electronic devices often include virtual or augmented reality headsets with displays having optical elements that allow users to view the displays. If care is not taken, components used to display images can be bulky and might not exhibit desired levels of optical performance. For example, variations in the optical elements can cause unsightly cosmetic artifacts that detract from the appearance of the images.

SUMMARY

An electronic device may have a display system for providing image light to an eye box. The display system may include a waveguide. An input coupler may couple image light into the waveguide. A cross-coupler may perform pupil expansion on the image light. An output coupler may couple the image light out of the waveguide and towards an eye box. The input coupler may include a first surface relief grating (SRG) in a substrate on the waveguide. The cross-coupler may include a second SRG in the substrate. The output coupler may include a third SRG in the substrate.

A capping layer may be disposed over the substrate. An anti-reflective coating may be disposed over the capping layer. Microstructures may be cut in non-SRG regions of the substrate that are separate from the first, second, and third SRGs. The microstructures may be non-diffractive to visible wavelengths and/or the image light. The microstructures may, for example, include sub-wavelength grooves or structures having dimensions that are at least 5-10 times less than a visible wavelength. At the same time, the microstructures may have a similar filling factor to the SRGs. This may cause portions of the capping layer over the microstructures to sink into the sub-wavelength grooves, thereby providing the capping layer with a relatively uniform thickness across a lateral area of the waveguide, without the microstructures producing visible artifacts or interacting with the image light.

DETAILED DESCRIPTION

Figure 1:
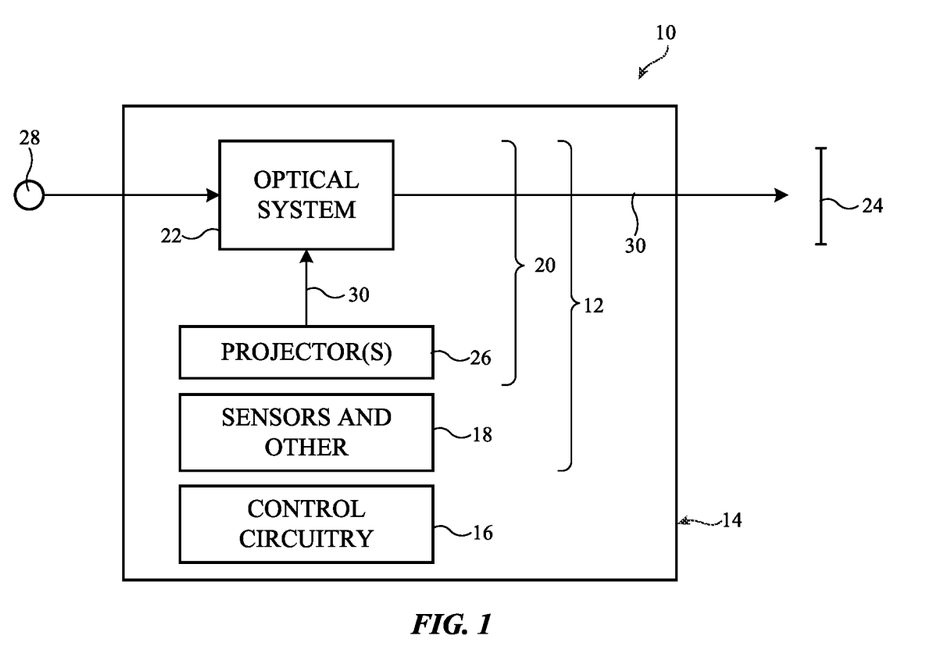
FIG. 1 is a diagram of an illustrative system having a display in accordance with some embodiments.

System 10 of FIG. 1 may be a head-mounted device having one or more displays. The displays in system 10 may include near-eye displays 20 mounted within support structure (housing) 14. Support structure 14 may have the shape of a pair of eyeglasses or goggles (e.g., supporting frames), may form a housing having a helmet shape, or may have other configurations to help in mounting and securing the components of near-eye displays 20 on the head or near the eye of a user. Near-eye displays 20 may include one or more display projectors such as projectors 26 (sometimes referred to herein as display modules 26) and one or more optical systems such as optical systems 22. Projectors 26 may be mounted in a support structure such as support structure 14. Each projector 26 may emit image light 30 that is redirected towards a user's eyes at eye box 24 using an associated one of optical systems 22. Image light 30 may be, for example, light that contains and/or represents something viewable such as a scene or object (e.g., as modulated onto the image light using the image data provided by the control circuitry to the display module).

The operation of system 10 may be controlled using control circuitry 16. Control circuitry 16 may include storage and processing circuitry for controlling the operation of system 10. Circuitry 16 may include storage such as hard disk drive storage, nonvolatile memory (e.g., electrically-programmable-read-only memory configured to form a solid state drive), volatile memory (e.g., static or dynamic random-access-memory), etc. Processing circuitry in control circuitry 16 may be based on one or more microprocessors, microcontrollers, digital signal processors, baseband processors, power management units, audio chips, graphics processing units, application specific integrated circuits, and other integrated circuits. Software code may be stored on storage in circuitry 16 and run on processing circuitry in circuitry 16 to implement operations for system 10 (e.g., data gathering operations, operations involving the adjustment of components using control signals, image rendering operations to produce image content to be displayed for a user, etc.).

System 10 may include input-output circuitry such as input-output devices 12. Input-output devices 12 may be used to allow data to be received by system 10 from external equipment (e.g., a tethered computer, a portable device such as a handheld device or laptop computer, or other electrical equipment) and to allow a user to provide head-mounted device 10 with user input. Input-output devices 12 may also be used to gather information on the environment in which system 10 (e.g., head-mounted device 10) is operating. Output components in devices 12 may allow system 10 to provide a user with output and may be used to communicate with external electrical equipment. Input-output devices 12 may include sensors and other components 18 (e.g., image sensors for gathering images of real-world object that are digitally merged with virtual objects on a display in system 10, accelerometers, depth sensors, light sensors, haptic output devices, speakers, batteries, wireless communications circuits for communicating between system 10 and external electronic equipment, etc.).

Projectors 26 may include liquid crystal displays, organic light-emitting diode displays, laser-based displays, or displays of other types. Projectors 26 may include light sources, emissive display panels, transmissive display panels that are illuminated with illumination light from light sources to produce image light, reflective display panels such as digital micromirror display (DMD) panels and/or liquid crystal on silicon (LCOS) display panels that are illuminated with illumination light from light sources to produce image light 30, etc.

Optical systems 22 may form lenses that allow a viewer (see, e.g., a viewer's eyes at eye box 24) to view images on display(s) 20. There may be two optical systems 22 (e.g., for forming left and right lenses) associated with respective left and right eyes of the user. A single display 20 may produce images for both eyes or a pair of displays 20 may be used to display images. In configurations with multiple displays (e.g., left and right eye displays), the focal length and positions of the lenses formed by system 22 may be selected so that any gap present between the displays will not be visible to a user (e.g., so that the images of the left and right displays overlap or merge seamlessly).

If desired, optical system 22 may contain components (e.g., an optical combiner, etc.) to allow real-world image light from real-world images or objects to be combined optically with virtual (computer-generated) images such as virtual images in image light 30. In this type of system, which is sometimes referred to as an augmented reality system, a user of system 10 may view both real-world content and computer-generated content that is overlaid on top of the real-world content. Camera-based augmented reality systems may also be used in device 10 (e.g., in an arrangement in which a camera captures real-world images of external objects and this content is digitally merged with virtual content at optical system 22).

System 10 may, if desired, include wireless circuitry and/or other circuitry to support communications with a computer or other external equipment (e.g., a computer that supplies display 20 with image content). During operation, control circuitry 16 may supply image content to display 20. The content may be remotely received (e.g., from a computer or other content source coupled to system 10) and/or may be generated by control circuitry 16 (e.g., text, other computer-generated content, etc.). The content that is supplied to display 20 by control circuitry 16 may be viewed by a viewer at eye box 24.

Figure 2:
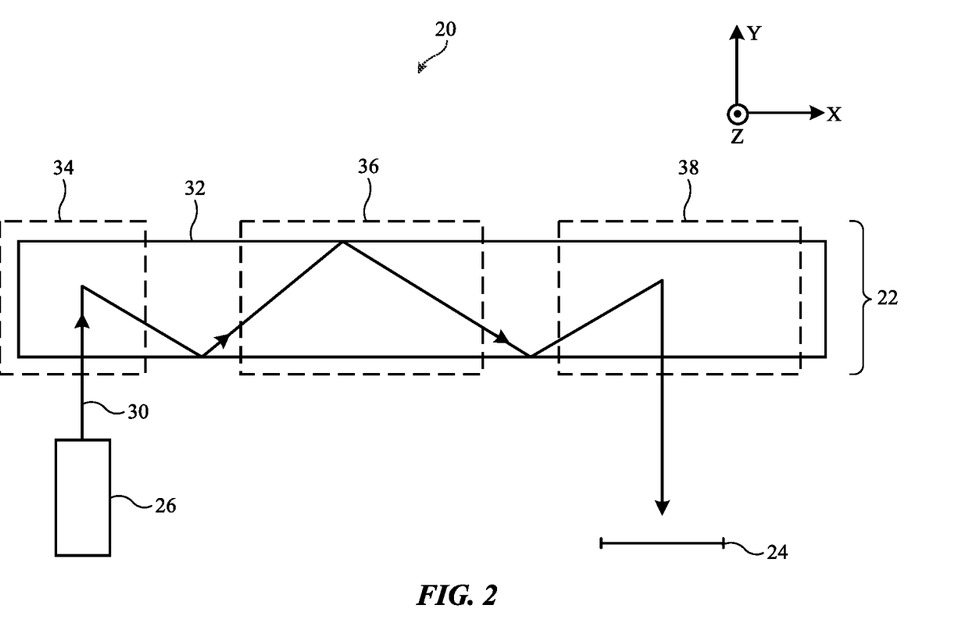
FIG. 2 is a top view of an illustrative optical system for a display having a waveguide with optical couplers in accordance with some embodiments.

FIG. 2 is a top view of an illustrative display 20 that may be used in system 10 of FIG. 1. As shown in FIG. 2, display 20 may include a projector such as projector 26 and an optical system such as optical system 22. Optical system 22 may include optical elements such as one or more waveguides 32. Waveguide 32 may include one or more stacked substrates (e.g., stacked planar and/or curved layers sometimes referred to herein as waveguide substrates) of optically transparent material such as plastic, polymer, glass, etc.

If desired, waveguide 32 may also include one or more layers of holographic recording media (sometimes referred to herein as holographic media, grating media, or diffraction grating media) on which one or more diffractive gratings are recorded (e.g., holographic phase gratings, sometimes referred to herein as holograms, surface relief gratings, etc.). A holographic recording may be stored as an optical interference pattern (e.g., alternating regions of different indices of refraction) within a photosensitive optical material such as the holographic media. The optical interference pattern may create a holographic phase grating that, when illuminated with a given light source, diffracts light to create a three-dimensional reconstruction of the holographic recording. The holographic phase grating may be a non-switchable diffractive grating that is encoded with a permanent interference pattern or may be a switchable diffractive grating in which the diffracted light can be modulated by controlling an electric field applied to the holographic recording medium. Multiple holographic phase gratings (holograms) may be recorded within (e.g., superimposed within) the same volume of holographic medium if desired. The holographic phase gratings may be, for example, volume holograms or thin-film holograms in the grating medium. The grating medium may include photopolymers, gelatin such as dichromated gelatin, silver halides, holographic polymer dispersed liquid crystal, or other suitable holographic media.

Diffractive gratings on waveguide 32 may include holographic phase gratings such as volume holograms or thin-film holograms, meta-gratings, or any other desired diffractive grating structures. The diffractive gratings on waveguide 32 may also include surface relief gratings (SRGs) formed on one or more surfaces of the substrates in waveguide 32 (e.g., as modulations in thickness of a SRG medium layer), gratings formed from patterns of metal structures, etc. The diffractive gratings may, for example, include multiple multiplexed gratings (e.g., holograms) that at least partially overlap within the same volume of grating medium (e.g., for diffracting different colors of light and/or light from a range of different input angles at one or more corresponding output angles). Other light redirecting elements such as louvered mirrors may be used in place of diffractive gratings in waveguide 32 if desired.

As shown in FIG. 2, projector 26 may generate (e.g., produce and emit) image light 30 associated with image content to be displayed to eye box 24 (e.g., image light 30 may convey a series of image frames for display at eye box 24). Image light 30 may be collimated using a collimating lens in projector 26 if desired. Optical system 22 may be used to present image light 30 output from projector 26 to eye box 24. If desired, projector 26 may be mounted within support structure 14 of FIG. 1 while optical system 22 may be mounted between portions of support structure 14 (e.g., to form a lens that aligns with eye box 24). Other mounting arrangements may be used, if desired.

Optical system 22 may include one or more optical couplers (e.g., light redirecting elements) such as input coupler 34, cross-coupler 36, and output coupler 38. In the example of FIG. 2, input coupler 34, cross-coupler 36, and output coupler 38 are formed at or on waveguide 32. Input coupler 34, cross-coupler 36, and/or output coupler 38 may be completely embedded within the substrate layers of waveguide 32, may be partially embedded within the substrate layers of waveguide 32, may be mounted to waveguide 32 (e.g., mounted to an exterior surface of waveguide 32), etc.

Waveguide 32 may guide image light 30 down its length via total internal reflection. Input coupler 34 may be configured to couple image light 30 from projector 26 into waveguide 32 (e.g., within a total-internal reflection (TIR) range of the waveguide within which light propagates down the waveguide via TIR), whereas output coupler 38 may be configured to couple image light 30 from within waveguide 32 (e.g., propagating within the TIR range) to the exterior of waveguide 32 and towards eye box 24 (e.g., at angles outside of the TIR range). Input coupler 34 may include an input coupling prism, an edge or face of waveguide 32, a lens, a steering mirror or liquid crystal steering element, diffractive grating structures (e.g., volume holograms, SRGs, etc.), partially reflective structures (e.g., louvered mirrors), or any other desired input coupling elements.

As an example, projector 26 may emit image light 30 in direction +Y towards optical system 22. When image light 30 strikes input coupler 34, input coupler 34 may redirect image light 30 so that the light propagates within waveguide 32 via total internal reflection towards output coupler 38 (e.g., in direction +X within the TIR range of waveguide 32). When image light 30 strikes output coupler 38, output coupler 38 may redirect image light 30 out of waveguide 32 towards eye box 24 (e.g., back along the Y-axis). In implementations where cross-coupler 36 is formed on waveguide 32, cross-coupler 36 may redirect image light 30 in one or more directions as it propagates down the length of waveguide 32 (e.g., towards output coupler 38 from a direction of propagation as coupled into the waveguide by the input coupler). In redirecting image light 30, cross-coupler 36 may also perform pupil expansion on image light 30 in one or more directions. In expanding pupils of the image light, cross-coupler 36 may, for example, help to reduce the vertical size of waveguide 32 (e.g., in the Z direction) relative to implementations where cross-coupler 36 is omitted. Cross-coupler 36 may therefore sometimes also be referred to herein as pupil expander 36 or optical expander 36. If desired, output coupler 38 may also expand image light 30 upon coupling the image light out of waveguide 32.

Input coupler 34, cross-coupler 36, and/or output coupler 38 may be based on reflective and refractive optics or may be based on diffractive (e.g., holographic) optics. In arrangements where couplers 34, 36, and 38 are formed from reflective and refractive optics, couplers 34, 36, and 38 may include one or more reflectors (e.g., an array of micromirrors, partial mirrors, louvered mirrors, or other reflectors). In arrangements where couplers 34, 36, and 38 are based on diffractive optics, couplers 34, 36, and 38 may include diffractive gratings (e.g., volume holograms, surface relief gratings, etc.).

The example of FIG. 2 is merely illustrative. Optical system 22 may include multiple waveguides that are laterally and/or vertically stacked with respect to each other. Each waveguide may include one, two, all, or none of couplers 34, 36, and 38. Waveguide 32 may be at least partially curved or bent if desired. One or more of couplers 34, 36, and 38 may be omitted. If desired, optical system 22 may include a single optical coupler that performs the operations of both cross-coupler 36 and output coupler 38 (sometimes referred to herein as an interleaved coupler, a diamond coupler, or a diamond expander) or cross-coupler 36 may be separate from output coupler 38. Implementations in which cross-coupler 36 or a single optical coupler that performs the operations of both cross-coupler 36 and output coupler 38 (e.g., which receives light from an input coupler) include surface relief gratings (SRGs) are described herein as an example.

Figure 3A:
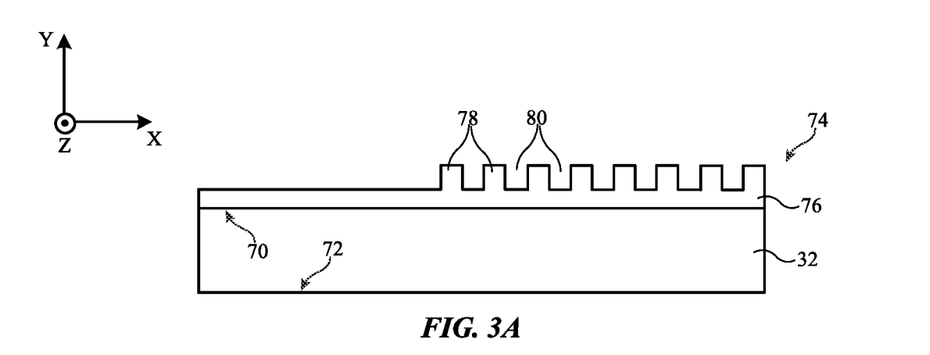
FIGS. 3A-3C are top views of illustrative waveguides provided with a surface relief grating in accordance with some embodiments.

FIG. 3A is a top view showing one example of how a surface relief grating may be formed on waveguide 32. As shown in FIG. 3A, waveguide 32 may have a first lateral surface 70 and a second lateral surface 72 opposite lateral surface 70 (sometimes referred to herein as waveguide surfaces). Waveguide 32 may include any desired number of one or more stacked waveguide substrates. If desired, waveguide 32 may also include a layer of grating medium sandwiched (interposed) between first and second waveguide substrates (e.g., where the first waveguide substrate includes lateral surface 70 and the second waveguide substrate includes lateral surface 72).

Waveguide 32 may be provided with a surface relief grating (SRG) such as surface relief grating 74. SRG 74 may be included in cross-coupler 36 or as part of an optical coupler that performs the operations of both cross-coupler 36 and output coupler 38 (e.g., a diamond expander or interleaved coupler), for example. SRG 74 may be formed within a substrate such as a layer of SRG substrate 76 (sometimes referred to herein as medium 76, medium layer 76, SRG medium 76, or SRG medium layer 76). While only a single SRG 74 is shown in SRG substrate 76 in FIG. 3A for the sake of clarity, SRG substrate 76 may include two or more SRGs 74 (e.g., SRGs having different respective grating vectors). If desired, at least a portion of each of the SRGs may be superimposed in the same volume of SRG substrate 76. In the example of FIG. 3A, SRG substrate 76 is layered onto lateral surface 70 of waveguide 32. This is merely illustrative and, if desired, SRG substrate 76 may be layered onto lateral surface 72 (e.g., the surface of waveguide 32 that faces the eye box).

SRG 74 may include peaks 78 and troughs 80 in the thickness of SRG substrate 76. Peaks 78 may sometimes also be referred to herein as ridges 78 or maxima 78. Troughs 80 may sometimes also be referred to herein as notches 80, slots 80, grooves 80, or minima 80. In the example of FIG. 3A, SRG 74 is illustrated for the sake of clarity as a binary structure in which SRG 74 is defined either by a first thickness associated with peaks 78 or a second thickness associated with troughs 80. This is merely illustrative. If desired, SRG 74 may be non-binary (e.g., may include any desired number of thicknesses following any desired profile, may include peaks 78 that are angled at non-parallel fringe angles with respect to the Y axis, etc.), may include peaks 78 with surfaces that are tilted (e.g., oriented outside of the X-Z plane), may include troughs 80 that are tilted (e.g., oriented outside of the X-Z plane), may include peaks 78 and/or troughs 80 that have heights and/or depths that follow a modulation envelope, etc. If desired, SRG substrate 76 may be adhered to lateral surface 70 of waveguide 32 using a layer of optically clear adhesive (not shown). SRG 74 may be fabricated separately from waveguide 32 and may be adhered to waveguide 32 after fabrication or may be etched into SRG substrate 76 after SRG substrate 76 has already been layered on waveguide 32, for example.

Figure 3B:
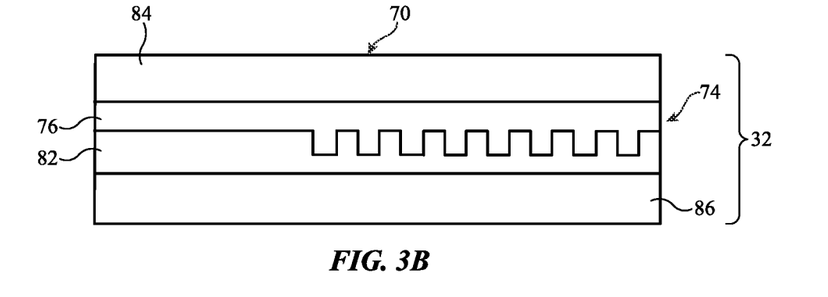

The example of FIG. 3A is merely illustrative. In another implementation, SRG 74 may be placed at a location within the interior of waveguide 32, as shown in the example of FIG. 3B. As shown in FIG. 3B, waveguide 32 may include a first waveguide substrate 84, a second waveguide substrate 86, and a media layer 82 interposed between waveguide substrate 84 and waveguide substrate 86. Media layer 82 may be a grating or holographic recording medium, a layer of adhesive, a polymer layer, a layer of waveguide substrate, or any other desired layer within waveguide 32. SRG substrate 76 may be layered onto the surface of waveguide substrate 84 that faces waveguide substrate 86. Alternatively, SRG substrate 76 may be layered onto the surface of waveguide substrate 86 that faces waveguide substrate 84.

Figure 3C:
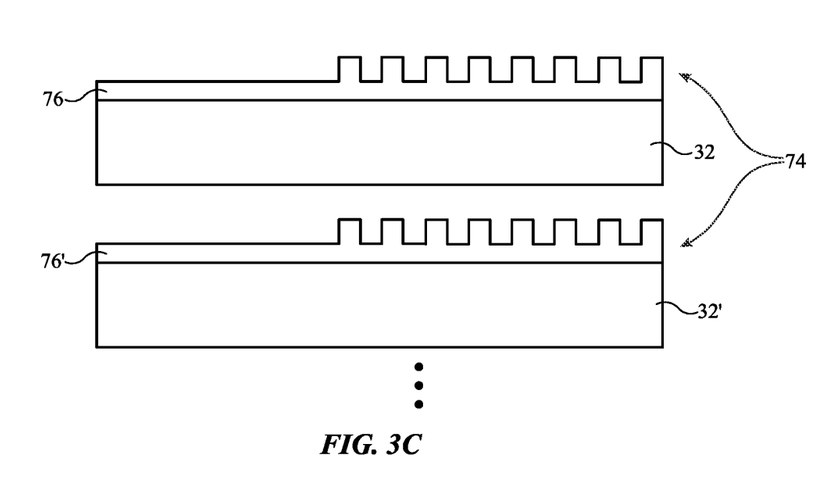

If desired, multiple SRGs 74 may be distributed across multiple layers of SRG substrate, as shown in the example of FIG. 3C. As shown in FIG. 3C, the optical system may include multiple stacked waveguides such as at least a first waveguide 32 and a second waveguide 32'. A first SRG substrate 76 may be layered onto one of the lateral surfaces of waveguide 32 whereas a second SRG substrate 76' is layered onto one of the lateral surfaces of waveguide 32'. First SRG substrate 76 may include one or more of the SRGs 74. Second SRG substrate 76' may include one or more of the SRGs 74. This example is merely illustrative. If desired, the optical system may include more than two stacked waveguides. In examples where the optical system includes more than two waveguides, each waveguide that is provided with an SRG substrate may include one or more SRG 74. While described herein as separate waveguides, waveguides 32 and 32' of FIG. 3C may also be formed from respective waveguide substrates of the same waveguide, if desired. The arrangements in FIGS. 3A, 3B, and/or 3C may be combined if desired.

Figure 4:
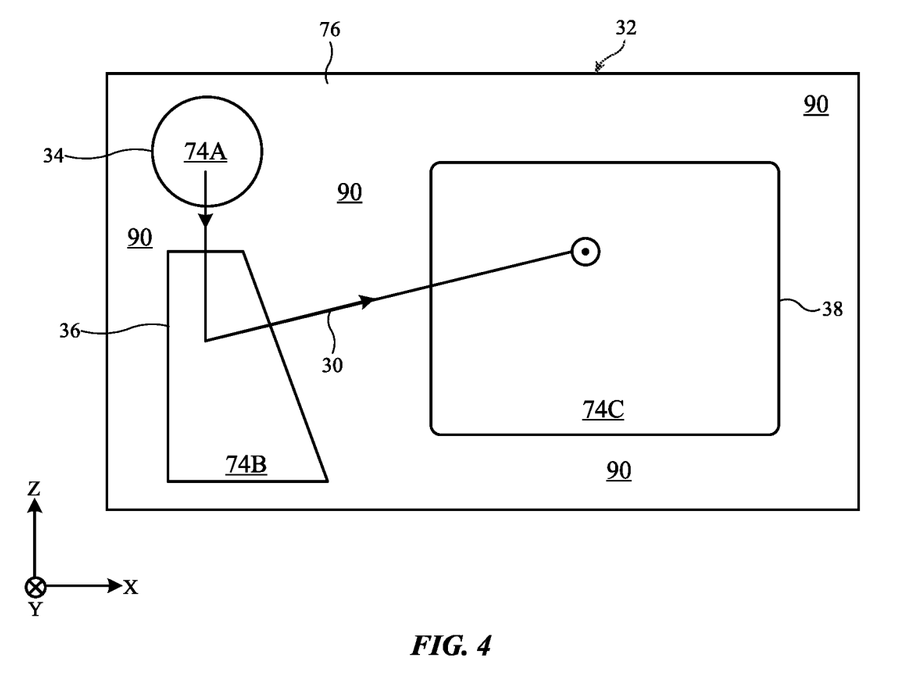
FIG. 4 is a front view of an illustrative waveguide that includes a substrate layer having regions with surface relief gratings and regions without surface relief gratings in accordance with some embodiments.

In some implementations that are described herein as an example, a single SRG substrate 76 may be used to form multiple different SRGs. Each of the different SRGs may be used to form a respective one of input coupler 34, cross-coupler 36, and/or output coupler 38 (FIG. 2). FIG. 4 is a front view of waveguide 32 having an SRG substrate 76 that includes multiple different SRGs for forming input coupler 34, cross-coupler 36, and output coupler 38.

As shown in FIG. 4, SRG substrate 76 may include a first SRG 74A formed from first modulations (e.g., first peaks 78 and troughs 80 of FIGS. 3A-3C) in a first region of SRG substrate 76. SRG substrate 76 may also include a second SRG 74B formed from second modulations (e.g., second peaks 78 and troughs 80 of FIGS. 3A-3C) in a second region of SRG substrate 76. SRG substrate 76 may further include a third SRG 74C formed from second modulations (e.g., third peaks 78 and troughs 80 of FIGS. 3A-3C) in a third region of SRG substrate 76. If desired, SRG substrate 76 may have more than three SRG regions.

First SRG 74A may form input coupler 34 for waveguide 32. Second SRG 74B may form cross-coupler (e.g., pupil expander) 36 on waveguide 32. Third SRG 74C may form output coupler 38 for waveguide 32. First SRG 74A may therefore couple image light 30 into waveguide 32 and towards second SRG 74B. Second SRG 74B may redirect image light 30 towards third SRG 74C and may optionally perform pupil expansion on image light 30 (e.g., may split image light 30 into multiple paths to form a larger beam that covers the eye pupil and forms a more uniform image). Third SRG 74C may couple image light 30 out of waveguide 32 and towards the eye box. If desired, third SRG 74C may also perform pupil expansion on image light 30.

SRG substrate 76 may also include regions 90 that are free from SRGs 74 or optical couplers. Regions 90 may, for example, be free from peaks 78 and troughs 80 that diffract image light 30. Regions 90 may separate SRG 74A from SRG 74B, may separate SRG 74B from SRG 74C, may separate SRG 74C from SRG 74A, and/or may laterally surround one or all of SRGs 75A-C. Regions 90 may sometimes be referred to herein as SRG-free regions 90, inter-SRG regions 90, non-SRG regions 90, or non-diffractive regions 90. SRG-free regions 90 may, for example, include all portions of SRG substrate 76 that do not include an SRG 74. The example of FIG. 4 is merely illustrative. Input coupler 34, cross-coupler 36, and output coupler 38 may have any desired lateral outlines or shapes.

Figure 5:
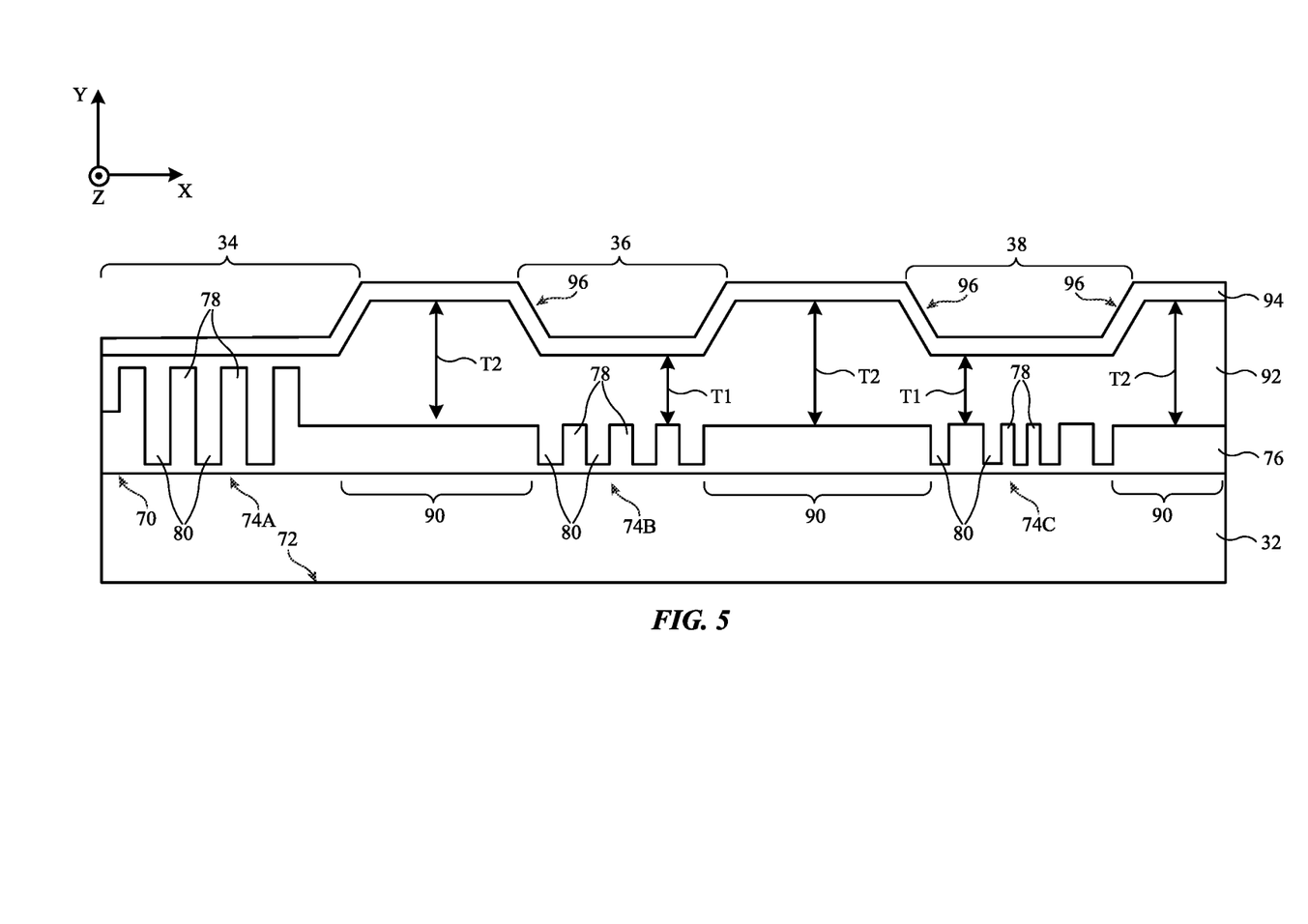
FIG. 5 is a top view of an illustrative waveguide that includes a substrate layer having surface relief gratings and regions without surface relief gratings, a capping layer on the substrate layer, and an anti-reflection layer on the capping layer in accordance with some embodiments.

FIG. 5 is a cross-sectional top view showing how SRGs 74A-C may be formed within SRG substrate 76. In the example of FIG. 5, SRG substrate 76 is layered onto lateral surface 70 of waveguide 32. If desired, SRG substrate 76 may be layered onto lateral surface 72 of waveguide 32.

As shown in FIG. 5, input coupler 34 may include first SRG 74A formed from first peaks 78 and troughs 80 in a first region of SRG substrate 76. Cross-coupler 36 may include second SRG 74B formed from second peaks 78 and troughs 80 in a second region of SRG substrate 76. Output coupler 38 may include third SRG 74C formed from third peaks 78 and troughs 80 in a third region of SRG substrate 76. SRG substrate 76 may include SRG-free regions 90 between and/or around (e.g., surrounding) the SRGs 74 in SRG substrate 76.

To mitigate unwanted surface reflections, an anti-reflective coating (ARC) (e.g., an anti-reflection layer) such as ARC 94 may be layered or coated over SRG substrate 76. However, in general, SRG substrate 76 may exhibit a relatively high refractive index. As such, a relatively low refractive index material such as capping layer 92 may be disposed over SRG substrate 76 between SRG substrate 76 and ARC 94. Capping layer 92 may help to maintain a strong refractive index contrast with SRG substrate 76 (e.g., a stronger difference in refractive index than when ARC 94 is disposed directly onto capping layer 92). This strong refractive index contrast may help to maximize the diffraction efficiency with which SRGs 74A, 74B, and 74C diffract image light 30.

At the same time, capping layer 92 may fill the troughs 80 in SRGs 74A, 74B, and 74C and may help to facilitate the deposition of ARC 94 (e.g., by serving as a planarization layer to prepare the surface for the deposition of ARC 94). Capping layer 92 may be deposited onto SRG substrate 76 (e.g., filling troughs 80) using a physical vapor deposition (PVD) process, a chemical vapor deposition (CVD) process, or a spin/curing process, as examples. Capping layer 92 may sometimes also be referred to herein as encapsulation layer 92, cap layer 92, protective layer 92, planarization layer 92, index contrast layer 92, or filling layer 92. Once capping layer 92 has been deposited over SRG substrate 76 and has filled troughs 80, ARC 94 may be deposited (layered) onto capping layer 92.

Capping layer 92 may be conformal or semi-conformal. As a result of the deposition process, the capping layer may not be completely flat across the surface area of waveguide 32. For example, the presence of troughs 80 in SRGs 74A-74C may allow the portion of capping layer 92 over SRGs 74A-74C to sink into the troughs during deposition, reducing the thickness of capping layer 92 over SRGs 74A-74C to a first thickness T1. However, SRG-free regions 90 do not include SRGs and therefore do not include any SRG troughs. As such, the material in capping layer 92 deposited over SRG-free regions 90 has nowhere to sink into SRG substrate 76, causing capping layer 92 to exhibit a second thickness T2 that is greater than first thickness T1 over SRG-free regions 90. In other words, the presence of both SRGs 74 and SRG-free regions 90 in SRG substrate 76 may cause portions of capping layer 92 over the SRGs to be shallower or thinner than portions of capping layer 92 over SRG-free regions 90, thereby producing bumps or ridges 96 having thickness T2 over SRG-free regions 90. Once ARC 94 is deposited over capping layer 92, ARC 94 will be separated from SRG substrate 76 by different distances (e.g., from thickness T1 to thickness T2) across the surface area of waveguide 32.

Such a non-flat surface can result in different optical interference effects over SRGs 74 than over SRG-free regions 90. These different interference effects may lead to visible light reflections of different colors at SRGs 74 than at SRG-free regions 90, producing unsightly visible (cosmetic) artifacts across the surface area of waveguide 32 that can be distracting to a user when using viewing or using system 10. If desired, capping layer 92 may be physically polished or etched prior to deposition of ARC 94 to help provide capping layer 92 with a more uniform thickness T across the lateral area of waveguide 32. However, it can be difficult to control the accuracy of polishing or etching performed on capping layer 92, which can lead to the production of other cosmetic artifacts and/or damage to SRGs 74.

Figure 6:
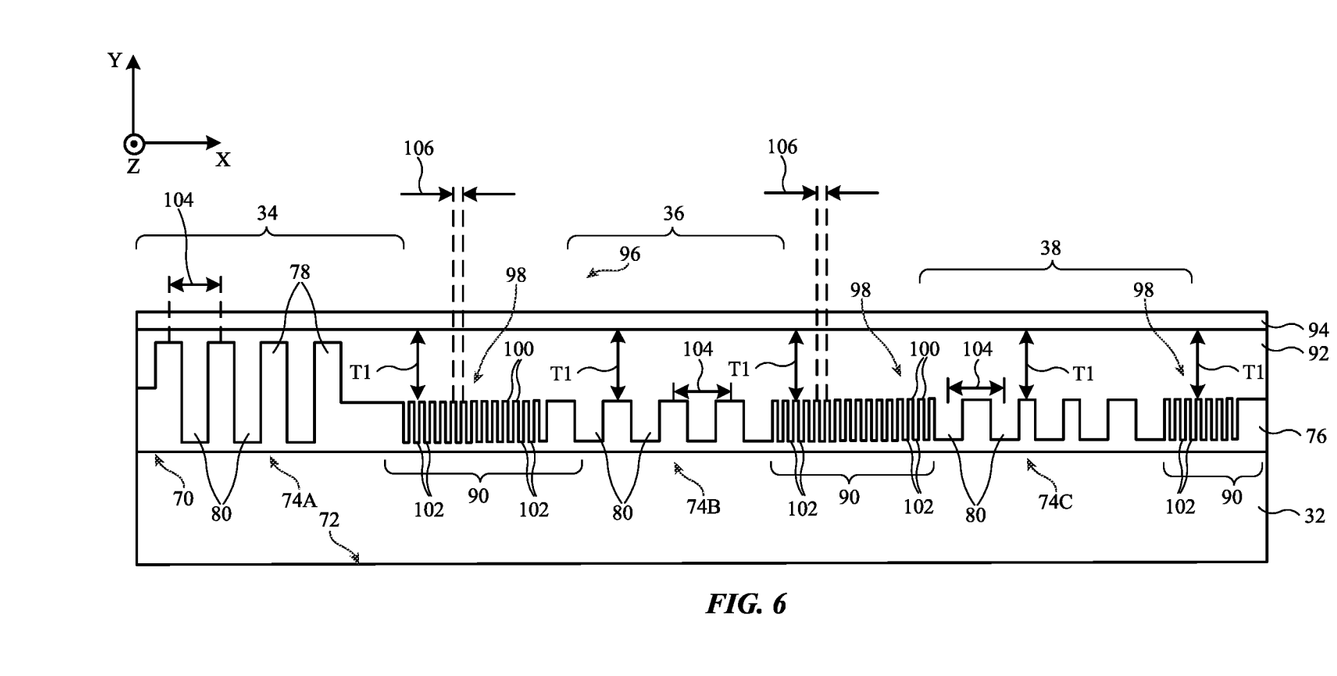
FIG. 6 is a top view of showing how microstructures may be included in an illustrative substrate layer of the type shown in FIG. 5 for mitigating thickness variations across a waveguide in accordance with some embodiments.

To mitigate these issues without polishing or etching capping layer 92 to exhibit a uniform thickness, SRG substrate 76 may be provided with microstructures within SRG-free regions 90 that serve to draw in the material of capping layer 92 during deposition but that do not diffract or otherwise affect the propagation of image light 30 within waveguide 32. FIG. 6 is a cross-sectional top view showing how SRG substrate 76 may be provided with microstructures within SRG-free regions 90 that serve to draw in the material of capping layer 92 during deposition but that do not diffract or otherwise affect the propagation of image light 30 within waveguide 32.

As shown in FIG. 6, each SRG-free region 90 of SRG substrate 76 may be provided with a pattern of microstructures 98. Microstructures 98 may be cut or etched into SRG substrate 76 after deposition on waveguide 32, for example. Micro-structures 98 may include a set of peaks 100 separated by a set of troughs 102. Peaks 100 may sometimes be referred to herein as ridges 100 or maxima 100. Troughs 102 may sometimes be referred to herein as notches 102, slots 102, grooves 102, or minima 102. The pattern of microstructures 98 may be substantially smaller than the wavelength of image light 30 to prevent the microstructures from diffracting or otherwise interacting with image light 30 as the image light propagates along waveguide 32, and to may prevent the microstructures from diffracting other visible light from the environment. This may prevent microstructures 98 from producing any visible artifacts or effects to image light 30 or to other visible light incident upon SRG substrate 76, thereby preventing the formation of cosmetic artifacts. Microstructures 98 may therefore sometimes be referred to herein as sub-wavelength microstructures or non-diffractive microstructures.

For example, the peaks 100 and troughs 102 of microstructures 98 may exhibit a pitch 106 (e.g., may be separated by a distance equal to pitch 106). On the other hand, the peaks 78 and troughs 80 of SRGs 74A-C may exhibit a pitch 104. Pitch 106 may be substantially less than pitch 104. Pitch 106 may, for example, be significantly less than a visible wavelength (e.g., the wavelength of image light 30, a wavelength between 380-700 nm, etc.). Troughs 102 may therefore sometimes be referred to herein as sub-wavelength troughs 102 or non-diffractive troughs 102. Pitch 106 may, for example, be less than 5 times smaller than the visible wavelength, less than 10 times smaller than the visible wavelength, etc. As one example, pitch 106 may be less than or approximately equal to 50 nm. This may prevent microstructures 98 from diffracting visible light in SRG-free regions 90 with higher order diffraction light that otherwise produces unnecessary flare from external light source or image light 30 (e.g., preventing microstructures 98 from themselves forming an SRG). The structure of microstructures 98 is not limited to two-dimensional patterning. If desired, microstructures 98 may be patterned with a three-dimensional structure in which refractive index varies across the cross-sectional plane with different material layers.

Upon deposition, the portion of capping layer 92 over microstructures 98 may be drawn into (e.g., may sink into) troughs 102, thereby preventing the build-up of the excess material in capping layer 92 over SRG-free regions 90 that would otherwise produce bumps 96 of FIG. 5. Microstructures 98 may, for example, be configured to exhibit the same or approximately the same filling factor (e.g., within 20%, 10%, etc.) as SRGs 74A-C, where filling factor (sometimes referred to as fill factor) is defined by the percentage of a given spatial volume that is occupied by material from SRG substrate 76. In other words, while troughs 102 of microstructures 98 are narrower and more closely spaced together than troughs 80 of SRGs 74A-C (e.g., because pitch 106 is less than pitch 104), there are more troughs 102 per unit volume within SRG substrate 76 than there are troughs 80 per unit volume within SRGs 74A-C, thereby allowing microstructures 98 and SRGs 74A-C to exhibit similar or equal filling factors. This may configure a similar amount (volume) of capping layer 92 to sink into troughs 80 of SRGs 74A-C as into troughs 102 of microstructures 98 (per unit surface area of waveguide 32), thereby causing capping layer 92 to exhibit a substantially uniform thickness T1 (e.g., with a variation in thickness of 5% or less about thickness T1) across both SRGs 74A-C and SRG-free regions 90.

Since capping layer 92 exhibits uniform thickness T1 across the lateral area of waveguide 32, capping layer 92 provides an even and uniform planarization layer for the deposition of ARC 94. This prevents the formation of differences in optical interference between non-SRG regions 90 and SRGs 74A-C, thereby preventing the formation of unsightly cosmetic artifacts across the lateral area of waveguide 32.

In addition, the sub-wavelength pattern of microstructures 98 may allow for image light 30 to maintain its phase while propagating along waveguide 32, since the effective refractive index of microstructures 98 is similar to that of SRGs 74A-C. The constant phase may, for example, help to prevent degradation in the fidelity of images provided to the eye box. The example of FIG. 6 is merely illustrative. One or two of SRGs 74A-C may be omitted if desired. In general, microstructures 98 may be provided in any SRG substrate 76 having any desired number of SRGs 74 for use in redirecting any desired light (e.g., visible light, world light from the environment, image light, infrared light for performing gaze tracking, etc.).

The foregoing is merely illustrative and various modifications can be made to the described embodiments. The foregoing embodiments may be implemented individually or in any combination.

What is claimed is:

1. An electronic device comprising:
  a waveguide;
  a substrate on the waveguide;
  a surface relief grating (SRG) in a first region of the substrate and having a first set of grooves;
  a second set of grooves in a second region of the substrate, the grooves in the second set of grooves being narrower than the grooves in the first set of grooves;
  a capping layer on the substrate and filling the first and second sets of grooves; and
  an anti-reflective coating on the capping layer.

2. The electronic device of claim 1, wherein the second set of grooves is non-diffractive at visible wavelengths.

3. The electronic device of claim 2, wherein the grooves in the second set of grooves have a pitch that is at least five times less than 380 nm.

4. The electronic device of claim 1, wherein the waveguide is configured to propagate light at a wavelength and the second set of grooves are non-diffractive at the wavelength.

5. The electronic device of claim 1, wherein the SRG is configured to couple light into the waveguide.

6. The electronic device of claim 1, wherein the SRG is configured to couple light out of the waveguide.

7. The electronic device of claim 1, wherein the waveguide is configured to propagate light and the SRG is configured to expand a pupil of the light.

8. The electronic device of claim 1, further comprising:
an additional SRG in a third region of the substrate and having a third set of grooves, the grooves in the second set of grooves being narrower than the grooves in the third set of grooves.

9. The electronic device of claim 8, wherein the SRG is configured to couple light into the waveguide, the additional SRG is configured to couple the light out of the waveguide, and the second region of the substrate is disposed between the first region and the third region.

10. The electronic device of claim 1, wherein the second region laterally surrounds the first region.

11. The electronic device of claim 1, wherein the second region is free from diffractive gratings.

12. Apparatus comprising:
a waveguide configured to propagate light at a wavelength;
a substrate on the waveguide;
a surface relief grating (SRG) in a first region of the substrate and configured to diffract the light;
microstructures cut into a second region of the substrate and having a pitch that is less than the wavelength;
an encapsulation layer on the substrate and filling the microstructures and troughs of the SRG; and
an anti-reflective coating on the encapsulation layer.

13. The apparatus of claim 12, wherein the microstructures are configured to not diffract the light.

14. The apparatus of claim 12, wherein the SRG has a first filling factor and the microstructures have a second filling factor that is within 10% of the first filling factor.

15. The apparatus of claim 12, wherein the microstructures comprise additional troughs that are narrower than the troughs of SRG.

16. The apparatus of claim 12, further comprising:
an additional SRG in a third region of the substrate and configured to diffract the light, the second region being disposed between the first region and the third region.

17. The apparatus of claim 12, wherein the pitch is at least 5 times less than a wavelength between 380 nm and 700 nm.

18. An electronic device comprising:
a waveguide;
a substrate on the waveguide;
an input coupler configured to couple light into the waveguide, the input coupler comprising a first surface relief grating (SRG) in the substrate;
an output coupler configured to couple the light out of the waveguide, the output coupler comprising a second SRG in the substrate;
a set of notches in a region of the substrate that is separate from the input coupler and the output coupler, wherein the set of notches is non-diffractive at visible wavelengths; and
a capping layer disposed over the first SRG, the second SRG, and the set of notches.

19. The electronic device of claim 18, further comprising:
an anti-reflective coating disposed on the capping layer.

20. The electronic device of claim 18, further comprising:
a cross-coupler configured to redirect the light from the input coupler towards the output coupler, the cross-coupler comprising a third SRG in the substrate, and the region of the substrate being separate from the cross-coupler.

* * * * *